Figure 5:
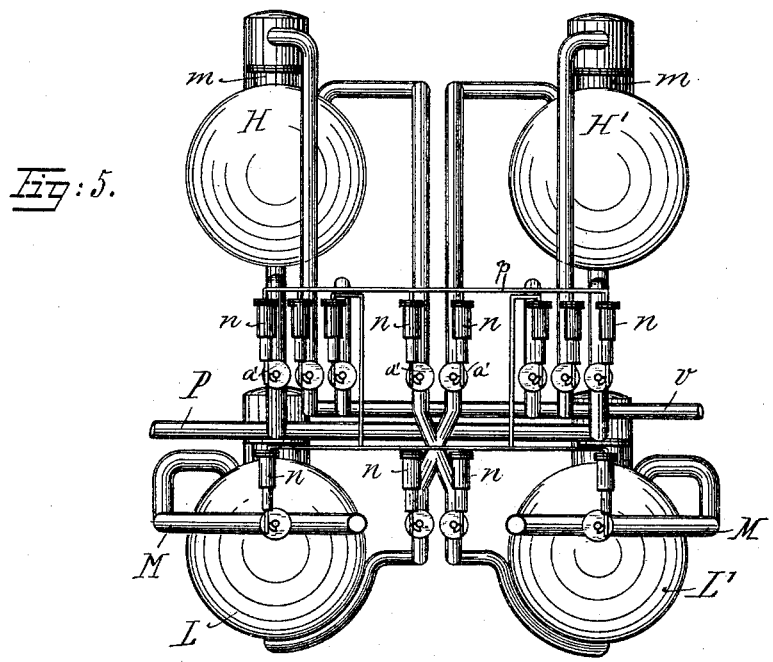

(No Model.)  5 Sheets—Sheet 1.
C. T. LIERNUR.
PNEUMATIC SEWERAGE SYSTEM.
No. 482,439.  Patented Sept. 13, 1892.
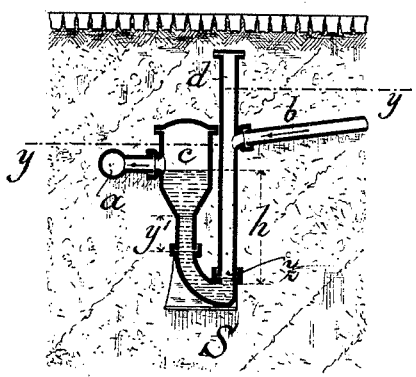
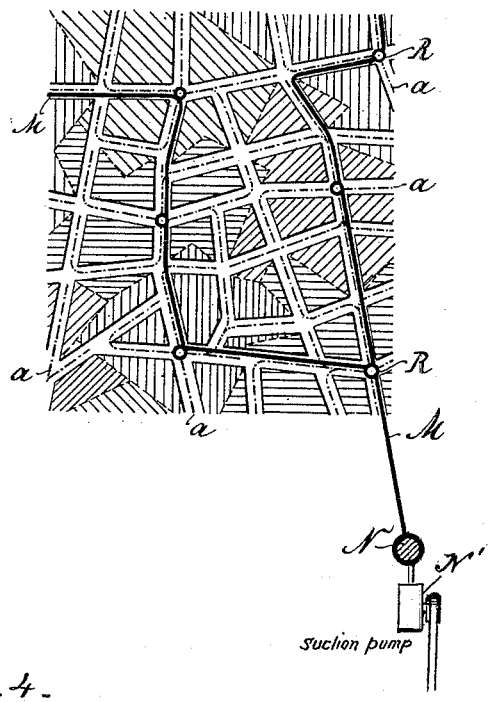
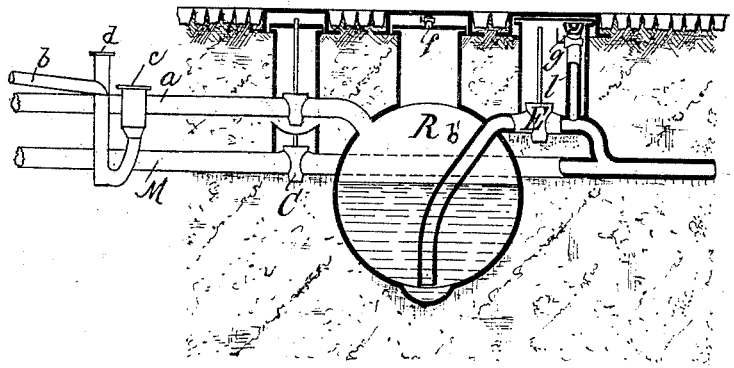
Witnesses
C. E. Jones.
A. R. Brown
Inventor:—
Charles Thieme Liernur
By Chas. J. Gooch
Attorney (No Model.) 5 Sheets—Sheet 2.
C. T. LIERNUR.
PNEUMATIC SEWERAGE SYSTEM.
No. 482,439. Patented Sept. 13, 1892.
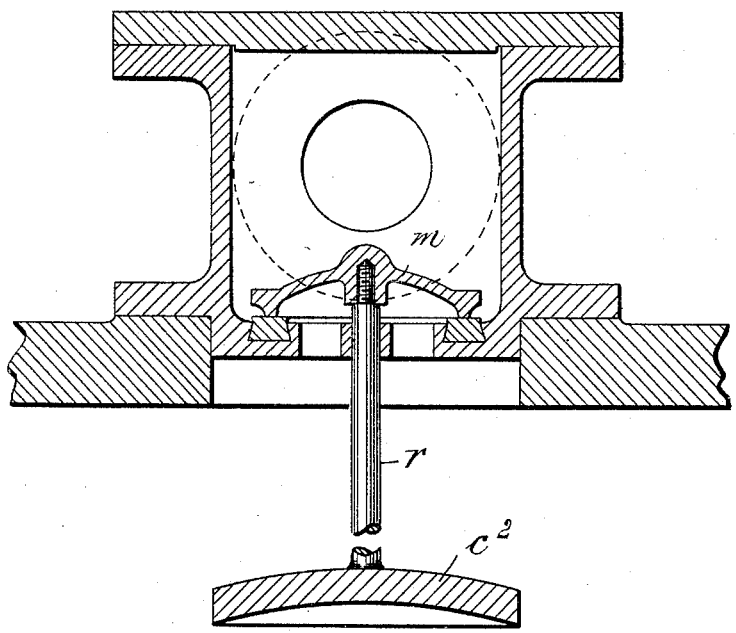
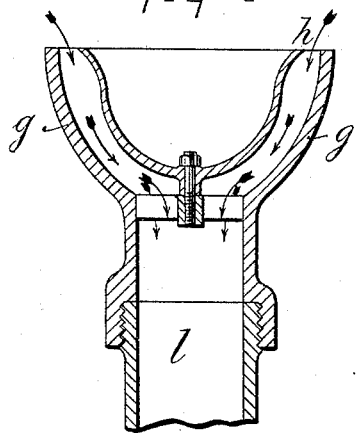
Witnesses:—
G. F. Domer.
A. R. Brown.
Inventor:—
Charles Thieme Liernur
By Chas. J. Gooch
Attorney.

(No Model.)  5 Sheets—Sheet 3.

C. T. LIERNUR.
PNEUMATIC SEWERAGE SYSTEM.

No. 482,439. Patented Sept. 13, 1892.

Witnesses
C. E. Jones
A. R. Brown

Inventor:
Charles Thieme Liernur
By Chas J. Gooch
Attorney (No Model.) 5 Sheets—Sheet 4.

C. T. LIERNUR.
PNEUMATIC SEWERAGE SYSTEM.

No. 482,439. Patented Sept. 13, 1892.

Witnesses:
C. E. Jones.
A. R. Brown.

Inventor:
Charles Thieme Liernur
By Chas J Gooch
Attorney.

(No Model.) 5 Sheets—Sheet 5.
C. T. LIERNUR.
PNEUMATIC SEWERAGE SYSTEM.
No. 482,439. Patented Sept. 13, 1892.
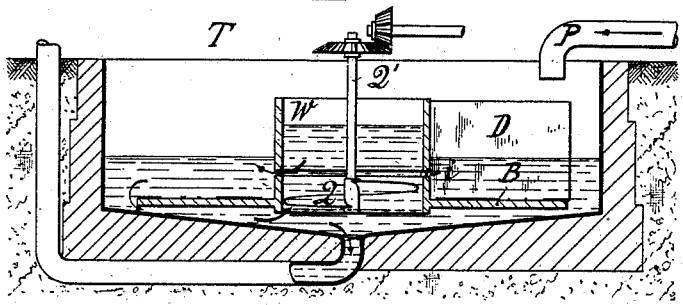
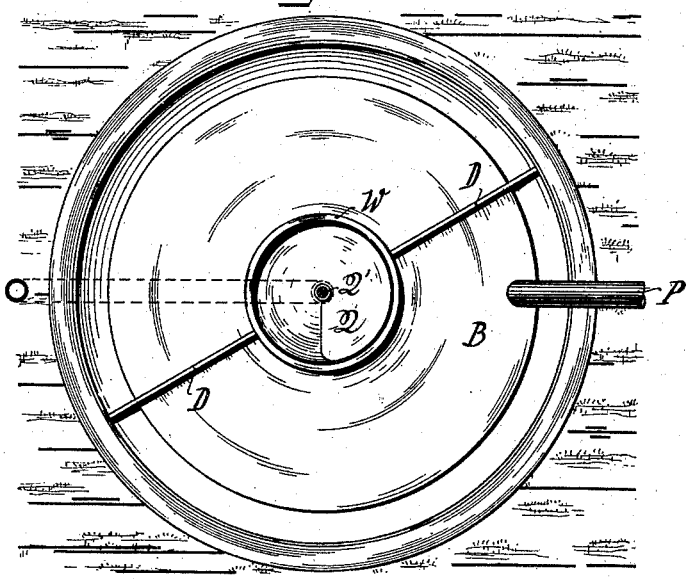
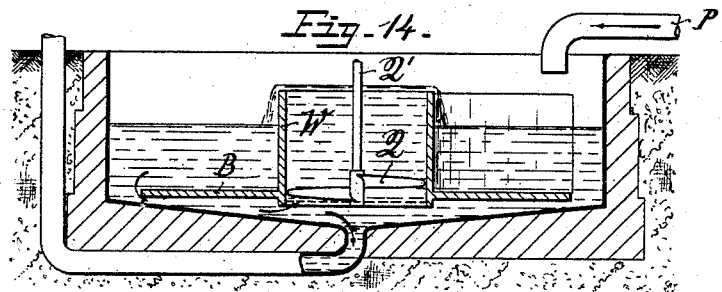

UNITED STATES PATENT OFFICE.

CHARLES THIEME LIERNUR, OF BERLIN, GERMANY.

PNEUMATIC SEWERAGE SYSTEM.

SPECIFICATION forming part of Letters Patent No. 482,439, dated September 13, 1892.

Application filed February 17, 1887. Serial No. 227,963. (No model.) Patented in Germany November 11, 1886, No. 40,488.

*To all whom it may concern:*

Be it known that I, CHARLES THIEME LIERNUR, a citizen of the United States of America, residing at Berlin, Germany, have invented certain new and useful Improvements in Pneumatic Sewerage, of which I declare the following to be a specification.

This invention has been patented to me in Germany, No. 40,488, dated November 11, 1886.

In the system of pneumatic sewerage introduced by me for the subterranean removal of water-closet and privy matter I divide the town (see Figure 1) into districts of twenty to one hundred acres area and provide each such district with a hermetically-closed iron reservoir R, placed in the center of the same, in order to collect the fecal matter of the same. A vacuum having been made in this reservoir, the stop-cock of any one of the district street-sewer pipes $a\ a$ emptying into the same is opened in order to drive the fecal matter present in its tributary fall-pipes and house-drains into the reservoir by atmospheric pressure. The air effecting this flows in at the top of the fall-pipes, which are for this purpose carried up above the roof of the building to be drained. All street-pipes emptying radially into the reservoir having been treated in this manner, the matter collected is transported for conversion into manure-powder to a general pumping-station N by means of a conduit M, running along all the various district-reservoirs R R.

The present improvements refer, first, to the junction of the house-drains $b$ with the district street-pipes $a$; secondly, to the connection of the street-reservoirs R with the main sewage-pipe M, and, thirdly, to the receiving apparatus at the pumping-station N, their general purpose being to obtain a greater speed of transport of the fecal matter through the various pipes in order to keep them better free from sedimentary deposits and to accelerate the whole process of removal.

Figure 8:
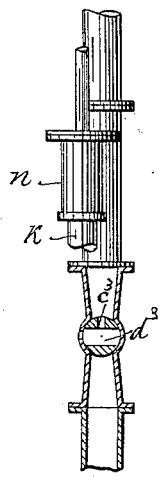
Figure 9:
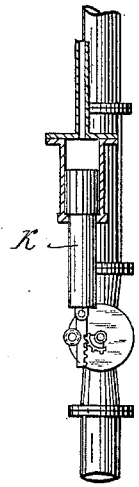
Figure 10:
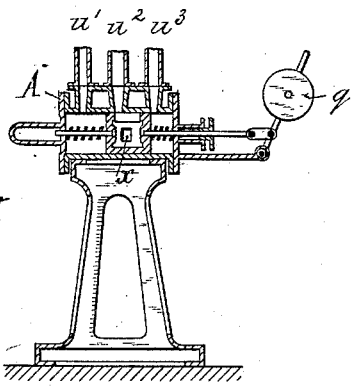
Figure 11:
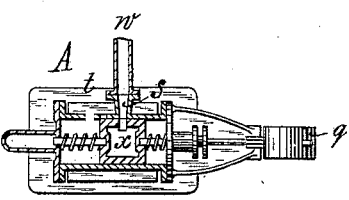

Fig. 1 is a general diagram of my improved system of pneumatic sewerage, representing the connection of the district-reservoirs R R R with the main transport-conduit M M leading to the general pumping-station N. Fig. 2 is a vertical section of a house-drain junction with a district-pipe. Fig. 3 is a top view or plan of this junction, partly in section, on the line $y\ y$ of Fig. 2. Fig. 4 is a vertical section of a district-reservoir in connection with the main sewer-pipe. Fig. 4$^a$ is a section of the signal. Fig. 5 is an end view, and Fig. 6 a top view or plan, partly in section, of the main receiving apparatus at the pumping-station. Fig. 7 is a part sectional view of the receiving apparatus. Fig. 7$^a$ is an enlarged sectional view of the valve $m$ and adjacent parts. Figs. 8 and 9 represent a device for automatically opening and closing the cocks leading to the receiving apparatus, partly in elevation and partly in section. Fig. 10 is a vertical section, and Fig. 11 a horizontal section, of a device for a reversing-gear for the receiving apparatus. Fig. 12 is the vertical section of the tank into which the receiving apparatus discharges for the purpose of collecting the fecal matter for being manufactured in poudrette without precipitating in the meanwhile its suspended substances. Fig. 13 is a top view of Fig. 12 with the bevel-wheels removed. Fig. 14 represents the inner cylindrical wall W of the tank arranged for mixing the sewage by lifting it over the wall's upper edge. Figs. 2 and 3 represent the house-drain junction. The same consists of the barometric trap S, interposed between the house-drain $b$ and the street-pipe $a$. The hydraulic height $h$ of each junction differs in accordance to its distance from the reservoir, this degree becoming, of course, less as the distance increases, and it being of the utmost importance to obtain along the whole street-pipe the same proportion as to height according to the distance from the reservoir, so as to secure the proper hydraulic action. The proper effect may be readily secured without change in the rest of the structure by the use of a longer or shorter section $y'$. The result is that when the pneumatic action takes place the inflow of the atmospheric air into the street-pipes occurs at all the junctions, right and left simultaneously, thus splitting up the fluid matter within these pipes into drops, and enabling the air-current then created to carry these drops into the reservoir with its own enormous velocity—namely, the one of a storm wind—instead of, as hitherto the case, only the one of a rapid current. The inflow of air occurs when the level of the fluid is sunk below Z, Fig. 2, in form of large bubbles, these passing through the fluid matter without carrying enough of it along for preventing the junction forming an hydraulic closure during the time when no pnuematic action ensues, or of preventing the maximum barometric resistance being formed when that action takes place, so that the arrangement is always ready for operation. This latter result is obtained by enlarging the top of $c$ sufficiently to keep the matter within it from being materially disturbed by the air-bubbles passing through it. At the same time the top of $d$ is carried up to the street-pavement and covered with a movable cover in order to remove, if necessary, sedimentary deposits at the base.

Fig. 4 represents the connection of the district-reservoirs R with the main sewage-pipe M. The main pipe M connects with the reservoir R by a branch pipe provided with a cock E, and between this cock and the connection of the branch with the main pipe M is an extra air-inlet pipe $l$, for a purpose hereinafter described. Formerly the operation of forcing the contents of a reservoir to the pumping-station was limited to opening this cock E and the air-cock $f$, provided in the top of the reservoir. There being a vacuum within the main pipe M, the atmospheric air pressed the fluid matter into it, and thence to the pumping-station. This had the great disadvantage that a new vacuum could not be made in the reservoir for effecting the drainage of another sewer-pipe until after the whole of the contents of the one pipe had reached the station. This serious loss of time is avoided by the present improvement. After a discharge has been effected from the reservoir R through the branch of the pipe M, extending into the same, the cock $f$ in the top of the reservoir may be closed and the cock E also, to prepare for another discharge, while the atmospheric pressure sufficient to force the first discharge to the receiving-station is obtained through the valved pipe $l$. The top of this pipe is furnished with a cup-shaped bell $g$, (shown enlarged in Fig. 4$^a$,) so arranged that a humming or whistling noise is produced by the air rushing past it through the crevice $h$ so soon as its speed of flow increases beyond a certain rate corresponding to the length of the column of fluid transported, this speed being a sign that the frictional resistance of the column has become less and that therefore part of the fluid matter must have already arrived at the station. The moment the humming noise of the bell is heard the cock of the air-inflow $f$ must be shut without waiting for the whole of the column reaching the station, seeing it will do this anyhow, partly on account of the momentum already acquired and partly by means of the expansion of the atmospheric air confined within the main pipe M. The timely closing of the air-inlets $f$ and $g$ prevents, therefore, more air having to be pumped out again than is absolutely necessary for sending the liquid mass to the pumping-station. The stop-cock C serves for limiting the length of the main pipe, within which a vacuum is to be made, to the portion of it actually required for emptying the reservoir in operation. The result of the whole arrangement is a great saving of time and of expenditure of power.

Figure 6:
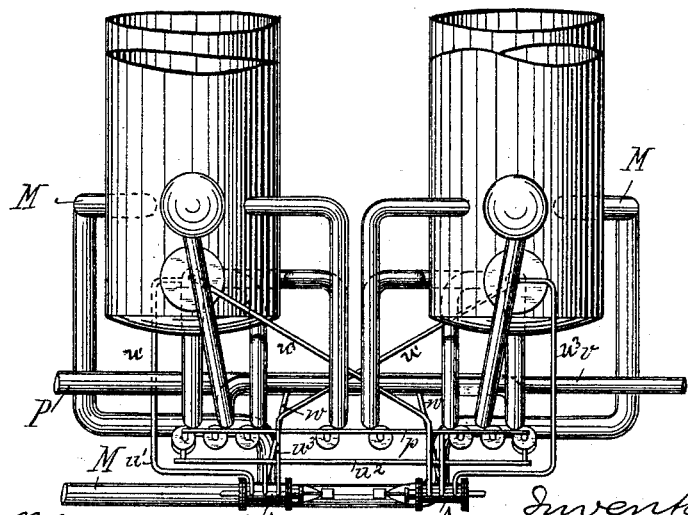
Figure 7:
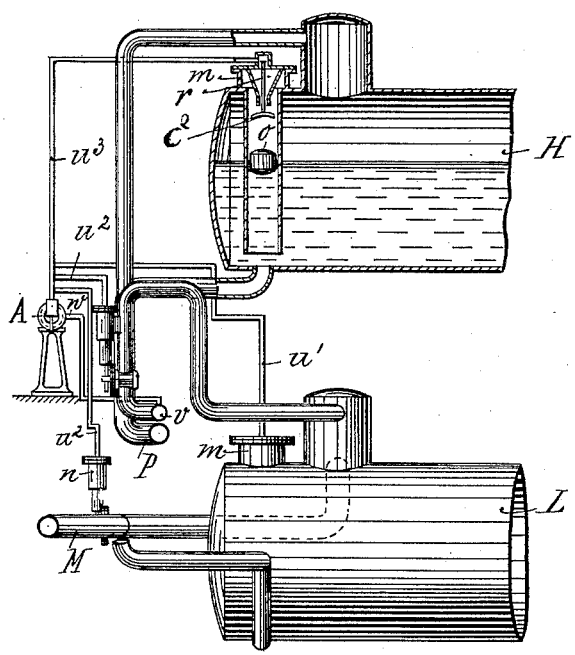

Figs. 5, 6, and 7 represent the improvements in the receiving apparatus at the pumping-station. This is intended to take the place of the vacuum-pump first applied immediately at the end of the main pipe for the double purpose of exhausting the air within it and of lifting the liquid following afterward from the deep level at which it is received to the height of the apparatus for converting it into manure-powder. This arrangement has, first, the disadvantage that the speed of the current within the main pipe depends upon the speed of the piston of the vacumn-pump, and that this speed for practical reasons is a limited one; secondly, that the valves and pistons of these pumps are exposed to the destructive effect of the sand and similar abrading substances which find their way through the closets. To prevent the cost of repair and loss of time due to this, the main pipe M is made to alternately discharge into the two low-level reservoirs L and L′, and these again are made to alternately discharge into the two high-level reservoirs H and H′ of the same size and lying above the first-named reservoirs, the matter being pneumatically lifted into the high-level ones H H in order to bring it to the height required for running off by gravitation into collecting-tanks, where it can remain until wanted for manure-manufacturing processes. These reservoirs L L′ and H H′ are, as shown, arranged in pairs for the purpose of expeditiously handling the matter which is first discharged into one of the lower tanks from the pipe M, and while one of the lower tanks is acting as a receiver the contents of the adjacent tank is being lifted by pneumatic or atmospheric pressure to one of the upper tanks, while from the other upper tank the contents is being discharged through the pipe P into the collecting-tank T, thus providing a continuous action, the lifting of the material of the upper tanks permitting flow by gravity alone to the collecting-tank T.

The lifting or forcing of the material may be done in many different ways, and I do not limit myself in this connection.

Any ordinary system of cocks and ways may be provided between the four tanks or reservoirs to control the contents thereof or their discharge from one into the other, the tanks being all connected to each other and being in connection with the inlet-pipes M and outlet-pipes P.

The valves controlling the various pipes and passages may be operated automatically by a vacuum-lift composed of a cylinder $n$, Figs. 8 and 9, with closed top and open bottom, having a piston $k$, heavy enough, Fig. 9, to close the cock or valve by its own weight when air is admitted to the upper part of the cylinder. The same are made of such diameter that one-fourth vacuum in the upper part of the cylinder suffices to lift the piston and open the cock or valve.

Fig. 9 shows the arrangement adapted to ordinary cocks, the rack attached to the piston-rod gearing into toothed sectors fixed to the stem of the cock, and Fig. 8 shows a section of such cocks as arranged for admitting to the reservoir either air or vacuum by means of the two ports $c^3$ and $d^3$. In case sliding or lifting valves are used of course the piston-rods must be provided with a corresponding gearing. The vacuum-lifts, which have to open and close cocks or valves simultaneously, are connected to a pipe $p$ for the simultaneous admittance of either a vacuum or of atmospheric air to all of the cylinders, and this admittance is made dependent upon the level of the liquid within the reservoirs, as determined by the position of a float $o$, floating loosely or unattached up and down. When this float reaches the base-plate $c^2$ of the rod $r$, it will lift the small valve $m$. (Shown enlarged in Fig. 7$^a$.) This valve connects the vacuum of the reservoir in question by means of the pipes $u'$ and $u^3$ with the regulator A. The said apparatus is composed of a cylinder, Figs. 10 and 11, the piston of which serves as a sliding valve and moves toward the portion of the cylinder momentarily placed in connection with the vacuum of the reservoir in operation. This causes the port $x$ in the piston to cover one of the openings $s$ $t$ in the side of the cylinder, one leading direct to the general vacuum-pipe $v$ through the connecting-pipe $w$, the other opening to the air. The port $x$ is therefore brought either in communication with the air or with a vacuum, and as this port also leads to an opening on the upper part of the cylinder of the regulator A, which connects it by means of the pipes $u^2$ with the various vacuum-lifts provided for simultaneously operating a series of cocks or valves, so the whole process of reversing is regulated by the float $o$ of the reservoir standing most in need of being discharged.

The piston-rods of the regulators are for the purpose of getting the opening of the slide and the cylinder to fit accurately, pivoted to the weighted lever $q$, which also serves for reversing the cocks or valves by hand, if need be. Of course this arrangement can be modified by gearing all the cocks or valves which have to work together by means of rods and cranks to a single vacuum-lift of large dimensions without changing anything in principle.

One regulating apparatus A is required for every low and high level reservoir together, and two of these should be so geared together that, as shown in the drawings, each high-level reservoir can serve as receiver for both the low-level ones; but it is not at all requisite that two groups consisting each of a low and high level reservoir should be employed. The general plan remains in principle unchanged when a third group is employed as reserve in case repairs should be necessary, with the exception that the connecting-pipes of the cocks or valves must in that case be so arranged that group No. 1 can either operate together with group No. 2 or No. 3 and No. 2 with either No. 3 or No. 1. In like manner no change in principle occurs when, on account of the smallness of the town, the low-level reservoir requires to be filled but a couple of times to collect all the fecal matter, thus doing the work in a few hours a day. In that case one group of a high and low level reservoir, or, perhaps, only a high-level one, would amply suffice and still leave time enough for repairs, making thus a second group, as well as a reserve, unnecessary. The improvement here aimed at does not refer to the number of reservoir groups, but to the employment of such reservoirs or groups of them generally and to their being connected with a pump for exhausting air only, instead of applying a pump for exhausting both air and liquid immediately at the end of the main pipe. This improvement secures a speed of transport within the said pipe due to the degree of vacuum in the reservoirs, these now obtaining the character of depots or stores of motive power and saving the cost of repairs due to getting sand and such like substances in the pumping-machines.

In Fig. 12 the collecting-tank T serves not only to disburden the high-level reservoirs and to equalize the difference beween the rate of arrival of fecal substances and their exit for manufacture into manure, but also to keep or bring these substances in the proper condition for manufacturing purposes, this requiring the same to be kept constantly in motion in order to prevent the precipitation of suspended matter and to make the mass thoroughly homogeneous. For this purpose the tank is supplied with a horizontal screw Q, attached to a vertical shaft Q', Fig. 12, having its bearing in a suitable step located near the bottom of the tank in such a manner that a free space is left under the floor B and at its edge. The fluid matter being lifted in the space W by the motion of the screw can either be thrown over its upper edge or pressed by hydraulic pressure through a narrow slot $i$, made in the wall of the space W, effecting in both cases a constant interchange of the lower strata with the higher ones. To prevent the mass acquiring through the motion of the screw a rotary motion, which might be produced by means of the centrifugal force developed and cause the suspended matters to get lodged in the corners between bottom and tank sides, radial partitions D D are applied for preventing all horizontal rotary motion.

The operation of my improved sewerage system is as follows: The house-pipes $b$ drain into the traps S, and these traps by hydraulic and vacuum action drain into the district-pipes *a*, which discharge into the district-reservoirs R, the vacuum or suction power being derived from the vacuum-pump N', Fig. 1, which may be of any known form, at the receiving-station N. When any district-reservoir R is to be discharged, a vacuum is set up between said reservoir and the station N and the valves E and *f* opened, the atmospheric pressure thus caused forcing the contents of the reservoir R through the branch *b'* of the pipe M, and this atmospheric pressure is aided by an air-inlet pipe *l*, which exerts sufficient pressure to force along the matter as soon as it is discharged from the reservoir, after which the valves E and *f* may be closed and the reservoir is then ready to receive another charge from the district-pipes, it being understood that during the discharge of the reservoir the valves C of the pipes M and *a* are closed. The material is discharged from the pipes M into the receiving tanks or reservoirs L L' and elevated by suitable means to elevated tanks or reservoirs H H', and from thence the material flows by gravity to a collecting-tank, where it is prevented from precipitation until drawn off for use.

Having particularly described the nature of my invention, what I claim is—

1. A sewerage system consisting of district-reservoirs, district-pipes leading thereto, house-pipes leading to the district-pipes, with traps interposed between the house and district pipes, discharge-pipes M between the district-reservoirs and the receiving-station, valved passages from the district-reservoir to the open air, valves for shutting off drainage communication to the district-reservoirs and opening communication to the receiving-station, and a suction-pump at the receiving-station, receiving-reservoirs connecting with the discharge-pipes M, and a collecting-tank in connection with the reservoirs, substantially as described.

2. In a sewerage system, a district-pipe, a house-pipe *b*, a vacuum-pump for forming a vacuum in the district-pipes *a*, and traps interposed between the district-pipes and house-pipes, said traps being of varying heights relatively to their distance from the suction-power, substantially as described.

3. In a sewerage system, a district-reservoir, district-pipes leading thereto, a discharge-pipe M from said reservoir, an air-valve in said reservoir, a valve E, controlling the discharge of the contents of the reservoir, a vacuum-pump in connection with the pipe, and an air-inlet on the opposite side of the valve E, substantially as described.

4. In a sewerage system, a collecting-tank for receiving the sewerage material, a rotating screw Q, a casing surrounding said screw, a vertical partition D between the casing and the walls of the tank, and a horizontal partition with a space between it and the bottom of the tank and a discharge.

In witness whereof I have hereunto signed my name in the presence of two subscribing witnesses.

CHARLES THIEME LIERNUR.

Witnesses:
ANTHONY STEFFEN,
B. ROI.